Figure 1:
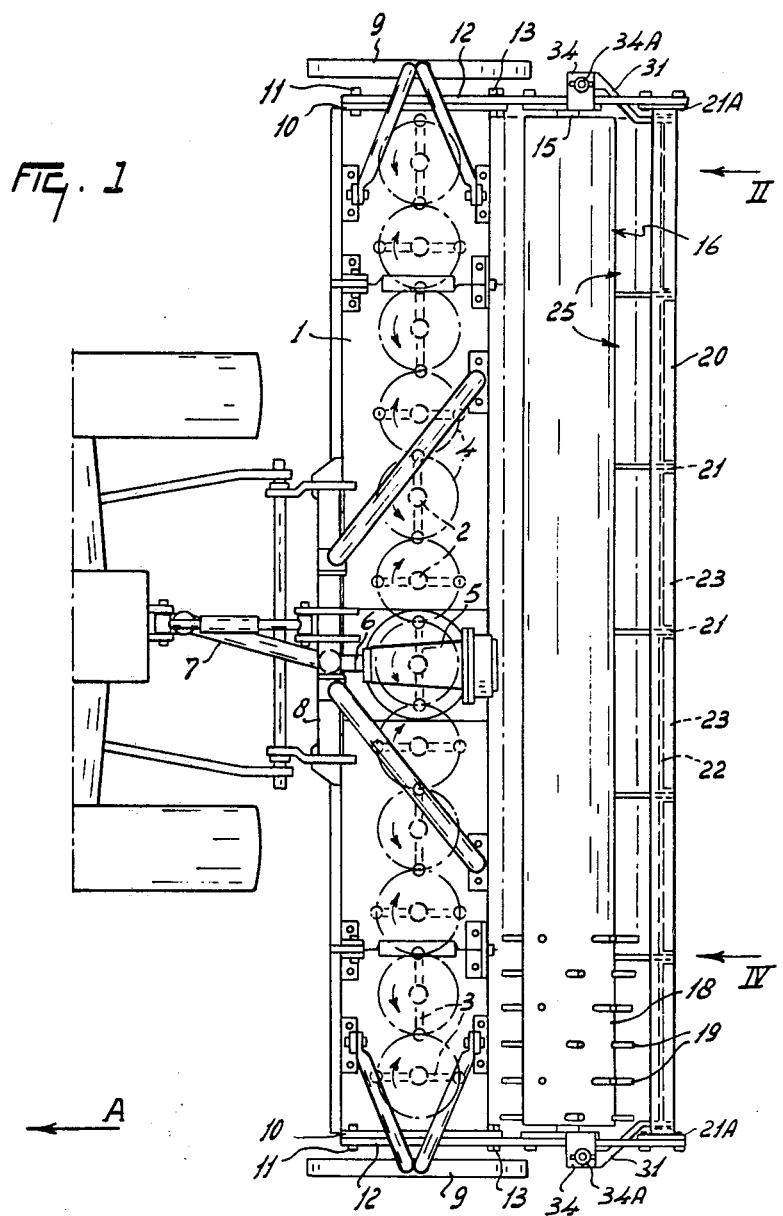

United States Patent [19]  [11] 4,200,156
van der Lely et al.  [45] Apr. 29, 1980

[54] SOIL CULTIVATING IMPLEMENTS

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 856,762

[22] Filed: Dec. 2, 1977

[30] Foreign Application Priority Data

Dec. 3, 1976 [NL] Netherlands ........................ 7613474

[51] Int. Cl.² ...................... A01B 71/08; A01B 29/06
[52] U.S. Cl. ........................................ 172/59; 172/68; 172/610
[58] Field of Search .................. 172/68, 59, 610, 607, 172/608, 122, 554, 39; 404/129

[56]  References Cited

U.S. PATENT DOCUMENTS

| 250,199 | 11/1881 | Burd | 172/607 |
| 510,785 | 12/1893 | Grant | 404/129 |
| 702,868 | 6/1902 | Clucas | 404/129 |
| 1,949,587 | 3/1934 | Smith | 404/129 X |
| 3,616,862 | 11/1971 | Lely | 172/68 |
| 3,902,437 | 9/1975 | Lely | 172/68 |

FOREIGN PATENT DOCUMENTS

| 296037 | 8/1928 | United Kingdom | 172/610 |
| 340593 | 1/1931 | United Kingdom | 172/610 |
| 1011993 | 12/1965 | United Kingdom | 404/129 |

Primary Examiner—Richard J. Johnson
Attorney, Agent, or Firm—Mason, Mason and Albright

[57]  ABSTRACT

A cultivating implement has a row of rotors that are driven to rotate about upwardly extending axes and an elongated roller with pins that project obliquely rearwardly, considering the normal direction of rotation of the roller. The roller is mounted on arms that are pivoted to the frame on pivots. On the rear ends of the arms, a carrier is pivoted and elongated scraper elements are mounted along the length of the carrier. The elements can be mounted in groups or single and extend forwardly and downwardly so that their forward end parts bear on the roller's surface between the pins. Gaps in the elements or between same allow the pins to pass during rotation of the roller. The carrier is interconnected with the arms by springs that bias the end parts into contact with the roller's surface.

15 Claims, 11 Drawing Figures

SOIL CULTIVATING IMPLEMENTS

This invention relates to soil cultivating implements, or machines, such as rotary harrows, of the kind which comprise a plurality of rotatable soil working members and a roller that is located to the rear of those members with respect to the intended direction of operative travel of the implement or machine, said roller being provided with a plurality of outward projections that are arranged in circular rows or crowns, the implement or machine also comprising scraping elements that are arranged to engage a body or sheath of the roller between said circular rows or crowns of projections. The term "implement or machine" will be shortened to "implement" alone throughout the remainder of this specification for the sake of brevity.

According to the invention, there is provided a soil cultivating implement of the kind set forth, wherein at least some of the scraping elements each engage said roller body or sheath at a horizontal level beneath that of the intended axis of rotation of the roller which is such that a plane containing the engagement location and said intended axis of rotation is inclined to a horizontal plane containing the same axis by an angle of not less than 10°, a further plane which is tangential to the roller body or sheath at said engagement location being in inclined relationship with at least a major portion of the scraping element.

Figure 2:
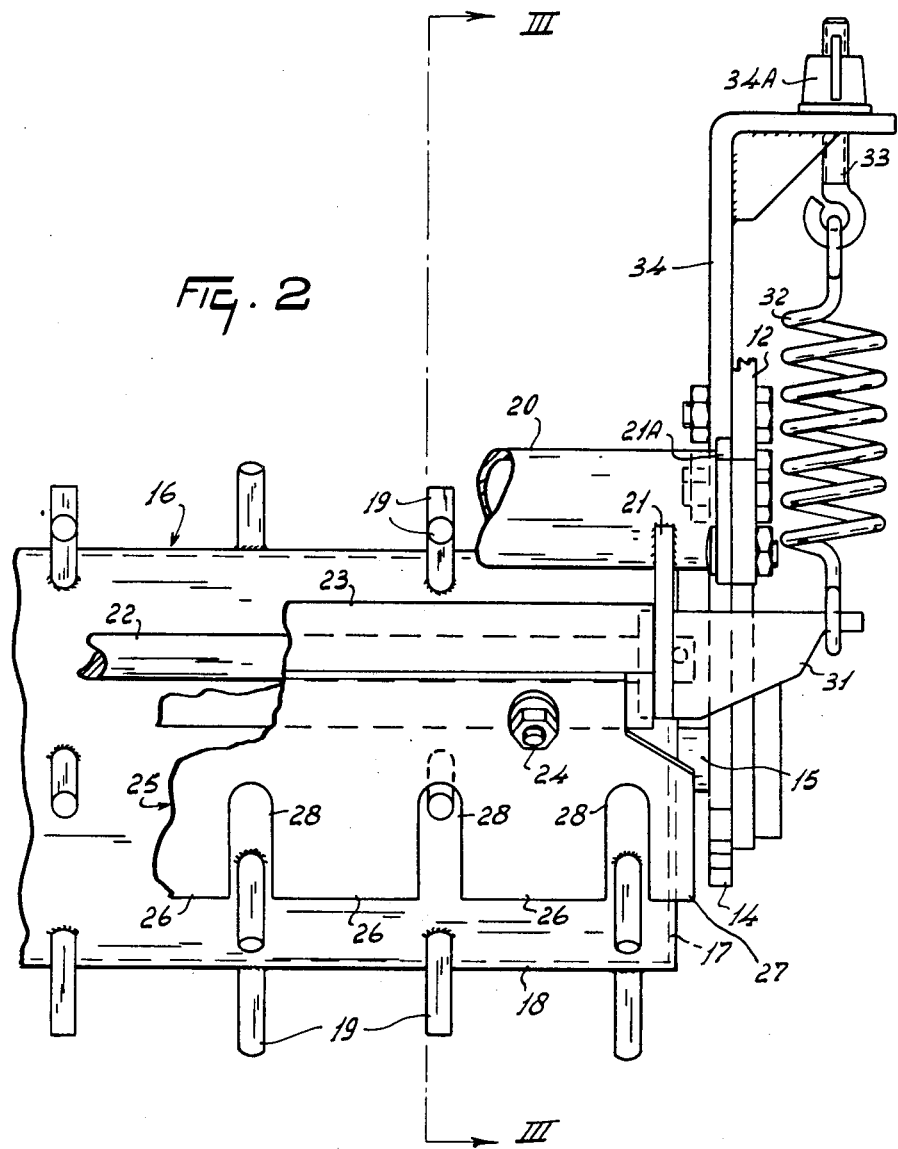
Figure 3:
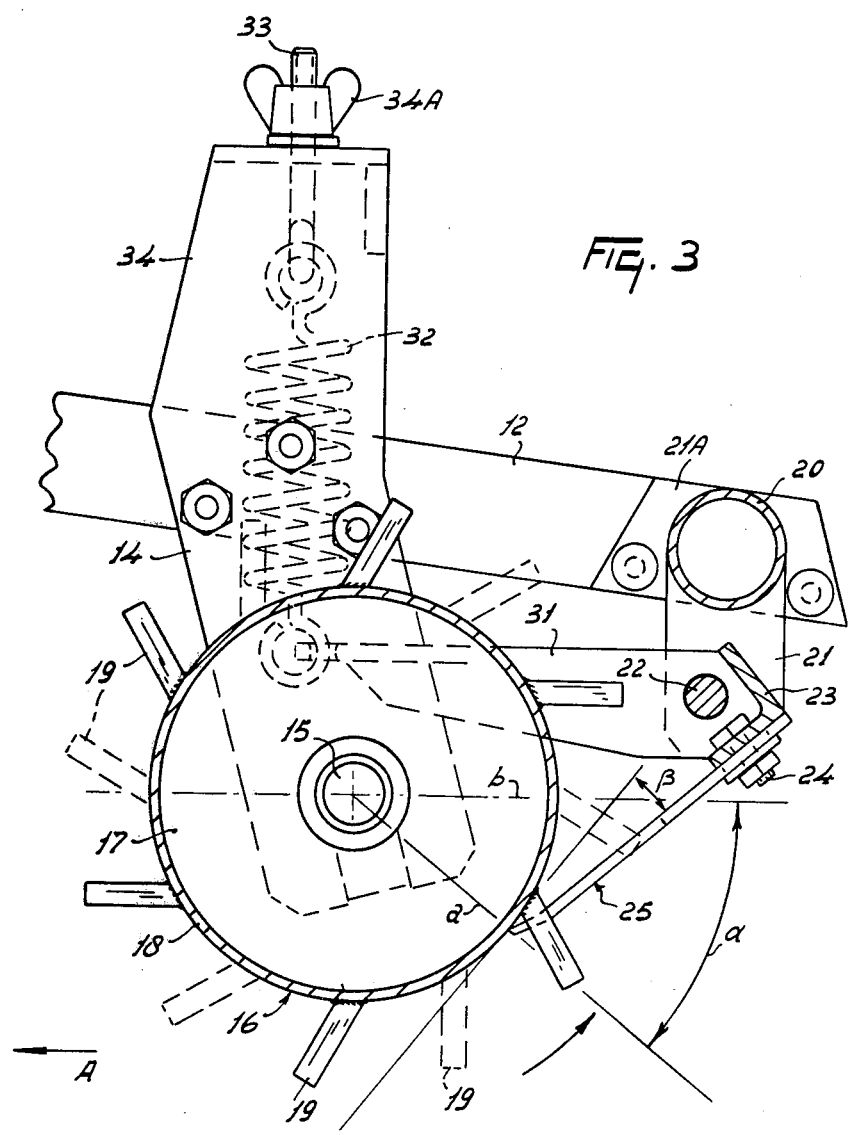
Figure 4:
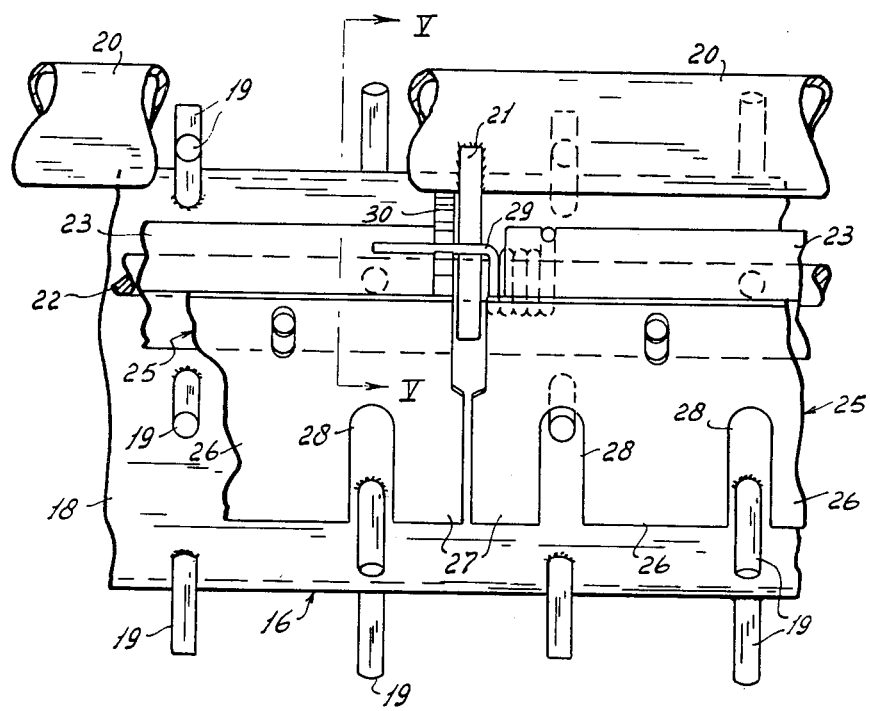
Figure 5:
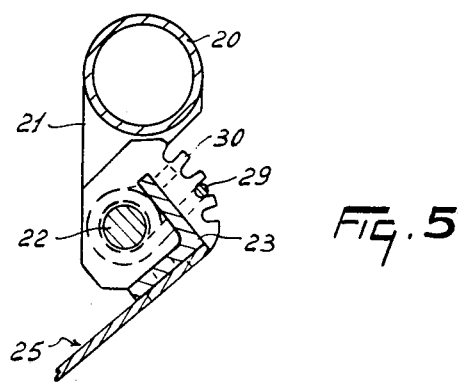
Figure 6:
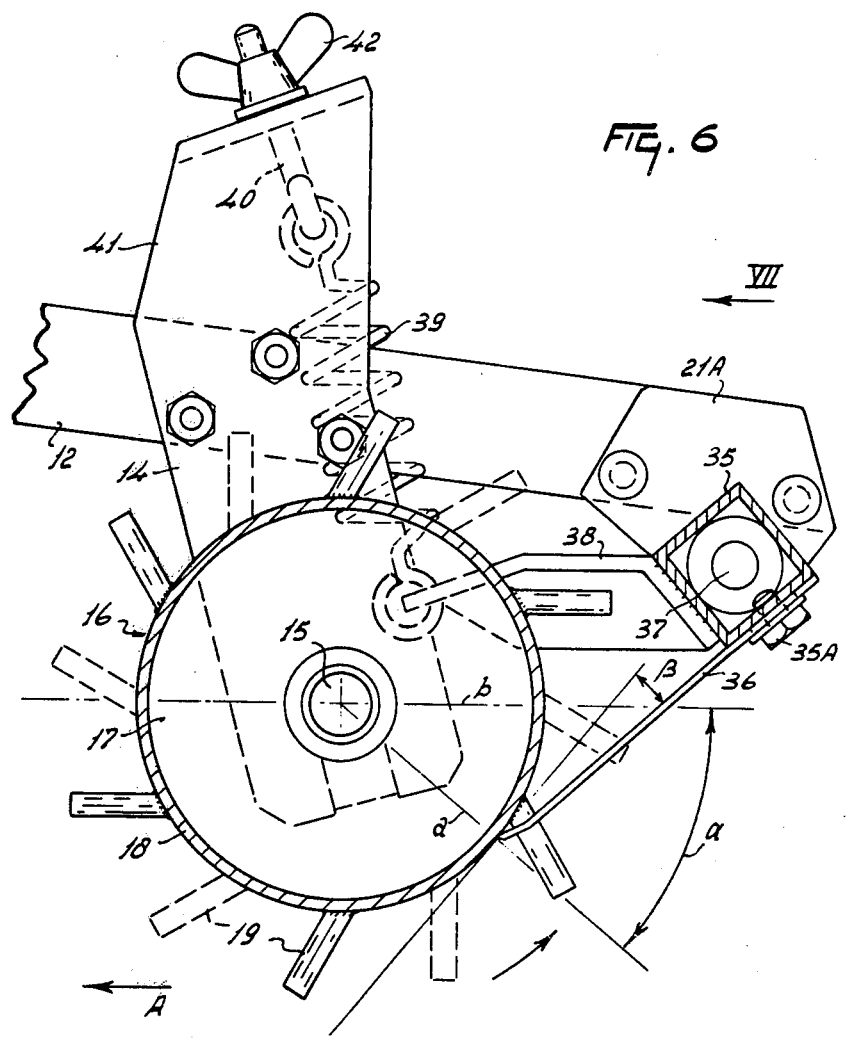
Figure 7:
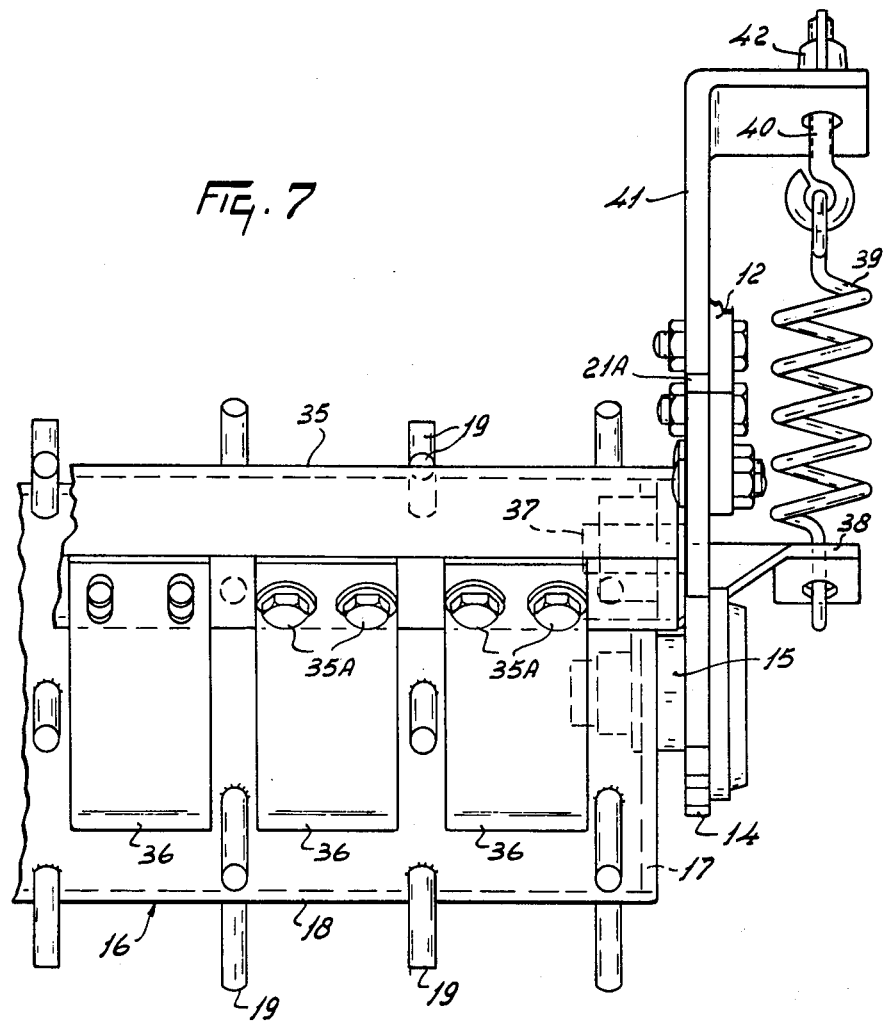
Figure 8:
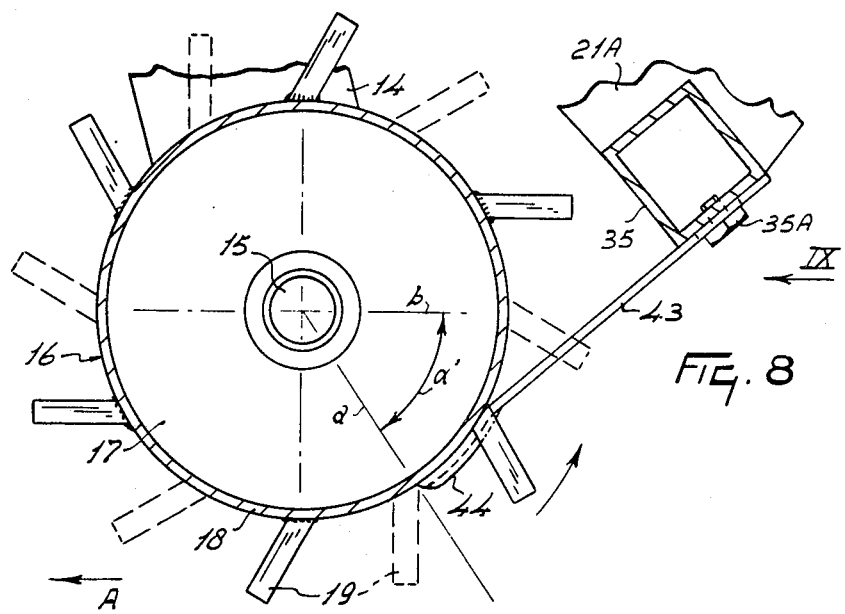
Figure 9:
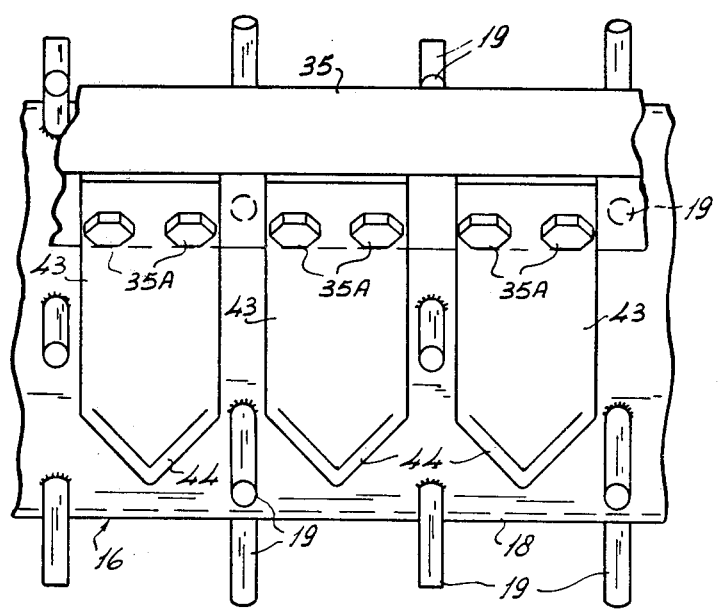
Figure 10:
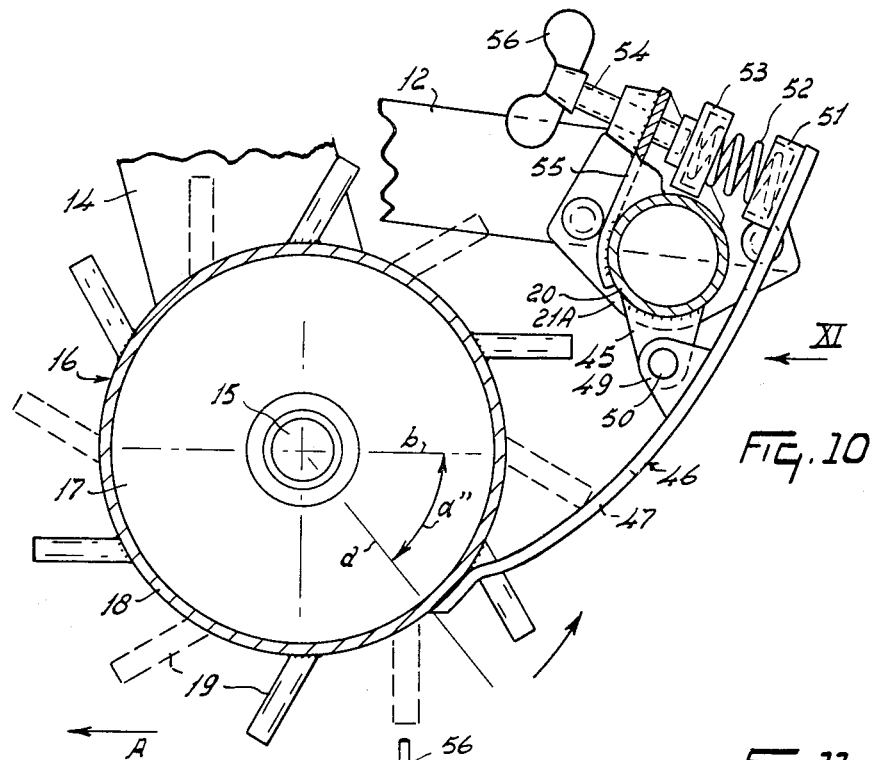
Figure 11:
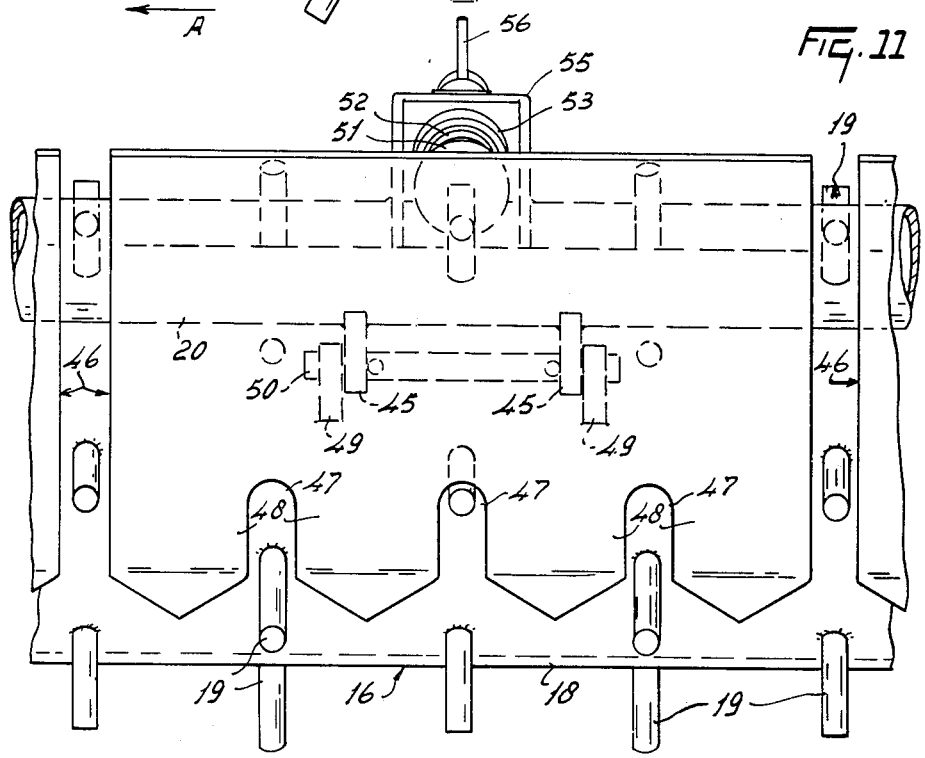

For a better understanding of the invention, and to show how the same may be carried into effect, reference will now be made, by way of example, to the accompanying drawings, in which:

FIG. 1 is a plan view of a soil cultivating implement in accordance with the invention, in the form of a rotary harrow, connected to the rear of an agricultural tractor, FIG. 2 is a partial rear elevation, to an enlarged scale, as seen in the direction indicated by an arrow II in FIG. 1, FIG. 3 is a section taken on the line III—III in FIG. 2, FIG. 4 is a partial rear elevation, to an enlarged scale, as seen in the direction indicated by an arrow IV in FIG. 1, FIG. 5 is a section taken on the line V—V in FIG. 4, FIG. 6 is a second section, to an enlarged scale, taken on the line III—III in FIG. 2 but illustrates an alternative construction to that of FIG. 3, FIG. 7 is a partial rear elevation as seen in the direction indicated by an arrow VII in FIG. 6, FIG. 8 is a third section, to an enlarged scale, taken on the line III—III in FIG. 2 but illustrates a further alternative construction to that of FIGS. 3 and 6, FIG. 9 is a partial rear elevation as seen in the direction indicated by an arrow IX in FIG. 8, FIG. 10 is a fourth section, to an enlarged scale, taken on the line III—III in FIG. 2 but shows another alternative construction, and FIG. 11 is a partial rear elevation as seen in the direction indicated by an arrow XI in FIG. 10.

Referring to FIGS. 1 to 5 of the accompanying drawings, the rotary harrow that is illustrated therein as an example of a soil cultivating implement in accordance with the invention has a hollow box-section frame portion 1 that extends substantially horizontally transverse, and usually (as illustrated) substantially horizontally perpendicular, to the intended direction of operative travel of the harrow which is indicated in several Figures of the drawings by an arrow A. A plurality of upwardly extending and normally vertically or substantially vertically disposed shafts 2 are rotatably supported in the hollow frame portion 1 and are arranged in a single row that extends parallel to the length of said frame portion 1 and thus substantially perpendicular, or at least transverse, to the direction A. There are twelve of the shafts 2 in the example that is being described and their coincident longitudinal axes and axes of rotation are spaced apart from one another by distances which advantageously, but not essentially, have magnitudes of substantially 25 centimeters. The lower ends of the shafts 2 project downwardly to beneath the bottom of the hollow frame portion 1 and each downwardly projecting portion is provided with a corresponding soil working member 3, the soil working members 3 being furnished with rigid soil working tines, of which there are two per member 3 in the example that is being described, that project downwardly into the soil when the harrow is in use. Each shaft 2 is provided, inside the hollow frame portion 1, with a corresponding straight-toothed or spur-toothed pinion 4, said pinions 4 being of such a size, and being so arranged, that the teeth of each pinion 4 are in mesh with those of its neighbour, or with those of both of its neighbours, in the single row of twelve pinions 4. With this arrangement, each pinion 4, together with the corresponding shaft 2 and soil working member 3, will rotate in the opposite direction to its neighbour, or to both of its neighbours, in the row when the rotary harrow is in use, the intended directions of such rotation being indicated by small arrows in FIG. 1 of the drawings.

One of the center pair of shafts 2 in the single row of twelve such shafts has an upward extension through the top of the hollow frame portion 1 onto a gear box 5 that is mounted on top of the hollow frame portion 1. Bevel pinions (not visible) within the gear box 5 place the upward shaft extension that has just been mentioned in driven connection with a lower shaft (not visible) that is rotatably mounted in the gear box 5 so as to extend substantially horizontally parallel to the direction A. An upper shaft 6 that is rotatably mounted in the gear box 5 in parallel but spaced relationship with said lower shaft has a splined or otherwise keyed leading end that projects forwardly from the front of the gear box 5 with respect to the direction A so that said shaft 6 serves as a rotary input shaft. Both the lower shaft (not visible) and the upper shaft 6 in the gear box 5 project through the rear wall of the gear box 5 into a change-speed gear that is mounted at the back of that gear box. The portions of the two parallel shafts that project into the change-speed gear are splined for the reception of the matchingly splined hubs of a chosen pair of straight-toothed or spur-toothed pinions of different sizes. These pinions are not visible in the drawings but there are preferably at least two-co-operating pairs thereof in which the pinions in each pair are of different effective diameters so that the particular pair which is chosen for use in the change-speed gear, and the arrangement thereof that is selected on the splined shaft ends, dictates the transmission ratio between the upper shaft 6 and the lower shaft in the gear box 5 and thus the speed at which all of the rotary soil working members 3 will be driven in response to a substantially constant driving speed that is applied to the forwardly projecting end of the upper shaft 6 when the rotary harrow is in use. At such times, the rotary input shaft that is afforded by the upper shaft 6 of the gear box 5 is placed in driven connection with the rear power take off shaft of an agricultural tractor or other operating vehicle by way of an intermediate telescopic transmission shaft 7, which is of a construction that is known per se, having universal joints at its opposite ends.

The front of the hollow frame portion 1, with respect to the direction A, is provided, midway across the width of that frame portion, with a coupling member or trestle 8 that is of substantially triangular configuration as seen in front or rear elevation. The coupling member or trestle 8 comprises two lower pivotal coupling points for connection to the free ends of the lower lifting links of a three-point lifting device or hitch of the operating agricultural tractor or other vehicle while the apex of said coupling member or trestle 8 carries a pair of parallel and substantially vertically disposed lugs or plates which define a third coupling point for pivotal connection to the rear end of the upper adjustable length lifting link of the same three-point lifting device or hitch. The connection of the coupling member or trestle 8 to the three-point lifting device or hitch of an agricultural tractor is shown somewhat diagrammatically in FIG. 1 of the drawings. Two substantially vertically disposed shield plates 9 are arranged at short distances beyond the opposite ends of the row of twelve rotary soil working members 3, both of them being in substantially parallel relationship with the direction A. The two shield plates 9 have lower edges which are constructed to slide forwardly over the ground surface in the direction A, or rearwardly with respect to that direction, during the operation of the harrow and it will be seen from FIG. 1 of the drawings that each plate 9 is connected to a corresponding pair of pivotal mountings on the top of the hollow frame portion 1 by two arms. The pivotal mountings comprise pins that define axes which are substantially horizonally parallel to the direction A so that each shield plate 9 can move upwardly and downwardly about the corresponding axis when the rotary harrow is in operation to enable it to match undulations in the surface of the ground which its lower edge may meet with when in operative progress in the direction A or during manoeuvring in the opposite direction. Each soil working member 3 is dimensioned so that it will work an individual strip of land that is a little greater in width than is the distance between the axes of rotation of two immediately neighbouring shafts 2 so that the strips which are worked by the twelve members 3 overlap one another to form, in effect, a single broad strip of worked soil which, with the dimensions that have been mentioned, will have a width of substantially 3 meters. The shield plates 9 co-operate with the two rotary soil working members 3 that are at the opposite ends of the row of twelve such members in ensuring that the soil is as well crumbled at the margins of the broad strip of land that is worked by the harrow as it is at location which are nearer to the middle of that strip. The shield plates 9 also minimise ridging of the soil at the margins of the broad strip of worked land and act to prevent stones and other hard objects that may be encountered by the tines of the soil working members 3 from being flung laterally of the path of travel of the harrow.

The opposite ends of the hollow frame portion 1 are closed by substantially sector-shaped side plates 10 that are substantially vertically parallel to one another and to the direction A. The broad upright edges of the side plates 10 project rearwardly beyond the remainder of the frame portion 1 with respect to the direction A and upper leading regions of said two side plates 10 carry corresponding substantially horizontally aligned strong pivots or stub shafts 11 about which arms 12, that extend generally rearwardly from the pivots or stub shafts 11 with respect to the direction A, are turnable upwardly and downwardly alongside the respective plates 10. Each plate 10 is formed, near to its rearmost edge, with a curved row of holes that are equidistant from the axis that is defined by the pivots or stub shafts 11 and each arm 12 is formed with a hole which is at the same distance from said axis and that, accordingly, can be brought into register with any chosen one of the holes in the neighbouring plate 10 by turning the arm 12 concerned upwardly or downwardly about its pivot pin or stub shaft 11. Bolts 13 are provided for entry through the holes in the arms 12 and chosen ones of the holes in the corresponding rows that are formed in the side plates 10 and it will be realised that, once said bolts 13 have been installed and tightened, the arms 12 are firmly, but releasably, retained in corresponding angular settings about the axis that is defined by the pivots or stubs shafts 11.

The arms 12 project some distance rearwardly with respect to the direction A behind the side plates 10 of the frame portion 1 and, towards their rearmost ends, corresponding supports 14 are bolted to them, said supports 14 having downwardly projecting portions which carry substantially horizontally aligned bearings for corresponding stub shafts 15. A roller 16 to which the stub shafts 15 are secured is arranged in a freely rotatable manner between the supports 14 and its axis of rotation is parallel or substantially parallel to the transverse length of the hollow frame portion 1 and thus perpendicular or substantially perpendicular to the direction A. Moreover, as will be evident from FIG. 1 of the drawings, the roller 16 extends throughout substantially the whole of the working width of the row of rotary soil working members 3. The roller 16 has substantially circular end plates 17, to which the corresponding stub shafts 15 are centrally secured, said end plates 17 closing a hollow right circular cylindrical body or sheath 18 of the roller. The outer curved surface of the body or sheath 18 has a diameter of substantially 270 millimeters and, is provided at regularly spaced intervals along its axial length with circular rows or crowns that each comprise a plurality of projections. Each projection is in the form of a straight pin or tine 19 and it will be seen from the drawings that each circular row or crown of pins or tines 19 is spaced from the or each neighbouring row or crown by a regular distance, the plane of rotation of each row or crown being substantially vertically disposed in perpendicular or substantially perpendicular relationship with the axis of rotation of the roller 16 and thus parallel or substantially parallel relationship with the direction A. The effective diameter of the roller 16, including its pins or tines 19, is substantially 400 millimeters.

Each straight pin or tine 19 is of a circular or substantially circular cross-section which is substantially constant throughou' the axial length of that pin or tine. The direction in which the roller 16 will rotate, by ground contact, when the harrow moves forwardly in the direction A is indicated by an arrow in FIG. 3 of the drawings and it will be seen that each pin or tine 19 trails rearwardly from root to tip with respect to that direction of rotation. In the embodiment that is being described, each circular row or crown of pins or tines 19 comprises less than eight, and preferably six, of those pins or tines and a plane which containes the longitudinal axes of the six pins or tines 19 of one row or crown is spaced from a similar and parallel plane that corresponds to the or each neighbouring row or crown by a distance of substantially 100 millimeters. The pins or tines 19 in each row or crown are, of course, spaced apart from one another at regular angular intervals around the longitudinal axis of the roller 16 and it will be seen from the drawings that the pins or tines 19 in each row or crown are angularly displaced about that axis relative to the pins or tines 19 in the or each neighbouring row or crown. In the particular example that is being described, the pins or tines 19 are spaced apart from one another at 60° intervals around the longitudinal axis of the roller 16 and the pins or tines 19 of one row or crown are angularly displaced by 30° around that axis relative to the pins or tines 19 of the or each neighbouring row or crown. With this arrangement, the pins or tines 19 in one row or crown lie midway between the pins or tines 19 in the or each neighbouring row or crown when the roller 16 is viewed lengthwise of its own axis of rotation (see FIG. 3). Since the pins or tines 19 in alternate circular rows or crowns occupy the same angular positions around the axis of rotation of the roller 16, those pins or tines are also disposed in rows that extend parallel to the axis of rotation of the roller 16.

Rear end regions of the two arms 12 are provided with corresponding supports 21A between which a tubular carrier 20 extends parallel or substantially parallel to the hollow frame portion 1 and to the roller 16, said carrier 20 preferably, but not essentially, having the circular cross-section that can be seen in the drawings. A plurality, such as seven, of lugs 21 project downwardly from the carrier 20 at regular intervals along the length of that carrier, there being one lug 21 close to each of the opposite ends of the carrier 20. The lugs 21 are formed with substantially horizontally aligned holes through which are entered a shaft 22 that thus extends parallel or substantially parallel to the carrier 20. A bar 23 of I-shaped cross-section is arranged between each neighbouring pair of lugs 21 so as to be turnable about the neighbouring shaft 22 in a manner which will be described below. The lower limb of each bar 23 has a corresponding plate 25 fastened to it by bolts 24, said bolts 24 being entered through slots in the plates 25 so that the plates 25 are adjustable in position relative to the corresponding bars 23 to a limited extent. Each plate 25 defines scraping elements of teeth 26 and 27 that are spaced apart form one another by slot-shaped gaps 28 which open onto the edges of the plates 25 that are remote from the bars 23. There are two elements or teeth 27 at the opposite ends of each plate 25 and four intervening elements or teeth 26 and it will be apparent from the drawings that each element or tooth 26 has a width in a direction that is parallel to the axis of rotation of the roller 16 which is substantially twice the width of each element or tooth 27 when measured in the same direction. With this arrangement, the two elements or teeth 27 that are at adjacent ends of neighbouring plates 25 are located very close to one another in co-operating relationship (see FIG. 4). In addition, the neighbouring ends of the two bars 23 that correspond to each neighbouring pair of plates 25 are interconnected by a spring 29 which comprises a portion that is coiled around the adjacent shaft 22. A sector-shaped element 30 that is formed at its edge with a plurality of recesses is fastened to one of the two neighbouring ends of each adjacent pair of bars 23 and the corresponding spring 29 has a straight end which can be lodged in any chosen one of the recesses in that element 30. The opposite end of each spring 29 is secured to the upper limb of the other bar 23 of the neighbouring pair close to the end concerned and it will be seen from the drawings that, at the junction betwen the successive bars 23 and plates 25, the pivotal connections between said plates 23 and the shafts 22 are afforded by the elements 30 and the coiled portions of the springs 29. The arrangement is such that each plate 25 is pivotable about the axis of the shaft 22, against resilient opposition, independently of the other plates 25.

The gaps 28 are so positioned that, during rotation of the roller 16, the pins or tines 19 of the successive circular rows or crowns will move through those gaps whose margins will therefore perform a scraping or shedding action upon the pins or tines 19. It can be seen in FIG. 3 of the drawings that the lower leading (with respect to the direction A) edge regions of the elements or teeth 26 and 27 of the various plates 25 are bent over angularly by a few degrees so as to be a little less inclined to the horizontal and to the direction A than are the remaining major portions of said elements of teeth 26 and 27. The free extremities of these edge regions engage the convex curved surface of the roller body or sheath 18 along a line which is located in a plane a that contains said line and the axis of rotation (longitudinal axis) of the roller 16. The plane a is inclined at an angle $\alpha$ to a horizontal plane b which contains the axis of rotation (longitudinal axis) of the roller 16, said angle $\alpha$ preferably having a magnitude of substantially 40° and the magnitude thereof being not less than 10°. The two bars 23 that are at the opposite ends of the row thereof themselves have ends which are quite close to the respective arms 12 and said ends, instead of being provided with the springs 29 and elements 30, carry corresponding forwardly and obliquely laterally projecting arms 31 which arms pivotally engage the shaft 22 (see FIG. 3) and have eyes at their leading ends, the eyes being coupled to the ends of corresponding helical tension springs 32. The helical tension springs 32 extend substantially vertically upwards from the corresponding arms 31 and their upper ends are coupled to corresponding eye bolts 33. Each support 14 has an upper portion 34 that is bent over at its upper end to form a substantially horizontally disposed bracket and it will be seen from FIGS. 2 and 3 of the drawings that the eye bolts 33 are entered through holes in said brackets, their upwardly directed screw-threaded shanks being provided, above the brackets, with corresponding wing nuts 34A. It will be apparent that the initial degree of tension in each spring 32 can be increased or decreased, as may be required, by appropriate axial adjustment of the respective wing nut 34A along the shank of the corresponding eye bolt 33.

FIGS. 6 and 7 of the drawings illustrate an alternative construction in which the supports 21A at the rear ends of the arms 12 are interconnected by a hollow carrier beam 35 which preferably, but not essentially, has the square or substantially square cross-section that is illustrated. Pairs of bolts 35A, that are provided with co-operating washers, secure separate scraping elements 36 to one flat external surface of the beam 35 and it will be seen from FIG. 7 of the drawings that said elements 36 register, in the direction A, with the gaps between the circular rows or crowns that are formed by the pins or tines 19. The holes in the elements 36 that co-operate with the bolts 35A are slotted (see the lefthand side of FIG. 7) to allow of some adjustment of the elements 36 relative to the carrier beam 35. Each element 36 is inclined downwardly and forwardly from the carrier beam 35 with respect to the direction A and has a leading edge region that is bent over angularly upwards by a very few degrees relative to the remainder thereof so as to have a marginally reduced inclination to the horizontal and to the direction A as compared with the rest of the element 36 in question. The leading extremities of said edge regions of the elements 36 make line engagement with the external curved surface of the body or sheath 18 of the roller 16. Each scraping element 36 is advantageously formed from a spring steel plate whose thickness is substantially 2 millimeters and whose width in a parallel direction to the length of the carrier beam 35 is substantially 80 millimeters. The adjustability of the elements 36 relative to the carrier beam 35 which is possible enables optimum positions of the edge regions thereof which engage the roller body or sheath 18 to be obtained. The carrier beam 35 is pivotally connected to the two supports 21A by substantially horizontally aligned pivot pins 37 that define an axis which is substantially coincident with the longitudinal axis of the carrier beam 35 itself. Arms 38 that project forwardly with respect to the direction A and laterally outwards to some extent, like the arms 31, are rigidly secured to the carrier beam 35 at locations which are adjacent to its opposite ends, the two arms 38 being formed at their leading ends with eyes which are engaged by eyes at the lower ends of corresponding helical tension springs 39. In this embodiment, the supports 14 have upper portions 41 whose upper ends are bent over to form obliquely disposed brackets. The shanks of eye bolts 40 are entered perpendicularly through holes in said brackets and the eyes thereof co-operated with eyes at the ends of the respective springs 39 which are remote from the associated arms 38. The shanks of each eye bolt 40 is provided, above the corresponding bracket, with a wing nut 42. The parts 39 to 42 inclusive function in a similar manner to the previously described parts 32 to 34A inclusive, the only significant difference in construction and arrangement being that, in the embodiment of FIGS. 6 to 7 of the drawings, the longitudinal axes of the springs 39 and eye bolts 40 are significantly inclined to the vertical. It will be apparent that the adjustable springs 39 tend to maintain the leading lower free edges of the scraping elements 36 in abutting line engagement with the body of sheath 18 of the roller 16.

In the embodiment of FIGS. 8 and 9 of the drawings, the carrier beam 35 fixedly, rather than pivotably, interconnects the supports 21A that are fastened to the two arms 12. A plurality of individual scraping elements 43 are employed and are adjustably connected to the carrier beam 35 by the bolts 35A whose shanks are entered through slotted openings in the corresponding elements 43. Each element 43 is formed from spring steel and the end thereof which makes contact with the body or sheath 18 of the roller 16 is formed into a V-shaped tip or point 44. Each symmetrically shaped tip or point 44 is curved to match the curvature of the external surface of the roller body or sheath 18, that is to say, it is curved throughout its length in such a way that the center of curvature thereof coincides with the axis of rotation (longitudinal axis) of the roller 16 (see FIG. 8) and, in order to strengthen said tip or point 44 and maintain the shape thereof, it is formed with stiffening ridges close to the two edges of the "V" profile concerned. It can be seen in FIG. 8 of the drawings that the V-shaped tip or point 44 of each element 36 is inclined to the remainder of that element so that said remainder extends upwardly and rearwardly, with respect to the direction A, away from the outer surface of the roller body or sheath 18 as viewed in FIG. 8. The carrier beam 35 and elements 43 are so disposed that the tip or point 44 of each element 43 is resiliently urged into engagement with the outer surface of the roller body or sheath 18. In this embodiment, the extremities of the tips or points 44 are contained in a plane a that also contains the axis of rotation (longitudinal axis) of the roller 16 and said plane a is inclined to the horizontal plane b that contains said axis of rotation (longitudinal axis) at an angle $\alpha$ which has a magnitude that is greater than 40°. Due to the curvature of each tip or point 44, the extremity thereof, like the remainder of that tip or point, is in contact with the outer surface of the roller body or sheath 18.

FIGS. 10 and 11 of the drawings illustrate an embodiment in which the carrier 20 is provided, at regular intervals along its length, with pairs of downwardly projecting lugs 45, the two lugs 45 in each pair being spaced apart from one another by a significant distance (see FIG. 11). Pivot shafts 50 that extend substantially horizontally parallel to the carrier 20 turnably connect each pair of lugs 45 to a corresponding pair of lugs 49 that are secured to the concave curved surface of a respective plate 46, a lower region of each plate 46 defining a group of four scraping elements or teeth 48 that are spaced apart from one another by intervening slot-shaped gaps 47. The gaps 47 register with the successive circular rows of crowns of pins or tines 19 and it will be seen from FIG. 11 of the drawings that further gaps which are provided between the plates 46 themselves also register with corresponding circular rows or crowns of said pins or tines 19, these further gaps being of substantially the same widths as are the gaps 47 between the integrally interconnected elements or teeth 48 in each plate 46. In the embodiment which is being described, there are four of the plates 46 and thus four groups of the elements or teeth 48 with a total of sixteen of those elements or teeth.

As inferred above, each plate 46 is of curved configuration (see FIG. 10) the concave side thereof facing forwardly and the convex side thereof rearwardly with respect to the direction A. However, each scraping element or tooth 48 has a somewhat shallow V-shaped tip or point that is of symmetrical configuration, said tip or point being curved to match the curvature of the external surface of the roller body or sheath 18 in substantially the same way as has already been described with reference to the embodiments of FIGS. 8 and 9 of the drawings. Thus, as can be seen in FIGS. 10 and 11 of the drawings, the tip or point of each element 48 is curved in a different manner to the remainder of the plate 46 of which it forms a part and the curvature thereof is not a smooth continuation of the curvature of the rest of that plate. Since the V-shaped configuration of each tip or point is a shallower or blunter one than in the case of the previously described tips or points 44, the tips or points of the elements or teeth 48 contact the external surface of the body or sheath 18 of the roller 16 over a region which subtends a smaller angle at the axis of rotation (longitudinal axis) of the roller 16 than do said tips or points 44. As a consequence, an angle $\alpha''$ that is enclosed between the plane a which contains the extremities of the tips or points of the elements 44 and the axis of rotation (longitudinal axis) of the roller 16 and the horizontal plane b which also contains said axis has a magnitude which is greater than that of the angle α (FIGS. 3 and 6) but less than that of the angle α' (FIG. 8). An upper edge region of each plate 46 is provided, midway across its width and at its leading concave side, with a cup 51 which receives one end of a corresponding helical compression spring 52. The opposite leading end of said spring 52 is engaged in an opposed cup 53 that is mounted turnably at one end of a screwthreaded rod 54. The screwthreaded shank of each rod 54 is entered through a matchingly screwthreaded block carried by a corresponding support bracket 55 that is welded or otherwise rigidly secured to the carrier 20 at an appropriate position along the axial length of that carrier. The end of each rod 54 which is remote from the corresponding cup 53 has a winged head 56 secured to it and it will be evident from FIG. 10 of the drawings that the initial degree of compression of each spring 52 can be increased, or decreased, as may be desired, by using the winged head 56 of the corresponding rod 54 to increase, or decrease, the spacing between the corresponding cups 53 and 51. The springs 52 urge the plates 46 in a clockwise direction about the coincident axes that are defined by the pivot shafts 50 and thus press the tips or points of the elements 48 resiliently into engagement with the external surface of the roller body or sheath 18, the strength of the resilient engagement being adjustable in the manner that has just been described.

In the use of the rotary harrow that has been described, its coupling member or trestle 8 is connected to the three-point lifting device or hitch at the rear of an agricultural tractor or other operating vehicle in the generally known manner that can be seen somewhat diagrammatically in FIG. 1 of the drawings and the upper shaft 6 (rotary input shaft) of the gear box 5 is placed in driven connection with the rear power takeoff shaft of the same tractor or other vehicle through the intermediary of the known telescopic transmission shaft 7 that has universal joints at its opposite ends. Adjustments that may be made, if required, before work commences include setting the transmission ratio in the change-speed gear at the back of the gear box 5 to increase or decrease the speed at which the soil working members 3 will revolve in response to a substantially constant driving speed applied to the shaft 6 and setting the maximum depth to which the tines of the members 3 can penetrate into the ground by changing the level of the axis of rotation of the roller 16 relative to that of the frame portion 1 which carries the soil working members 3. This latter adjustment is made, as briefly described above, by temporarily removing the bolts 13, turning the arms 12 upwardly or downwardly about the pivots or stub shafts 11 and finally replacing and tightening the bolts 13 when the required setting has been established. These adjustments are usually made having regard to the nature and condition of the soil that is to be cultivated and the particular purpose for which that soil is required after treatment. As the rotary harrow moves operatively in the direction A over soil that is to be cultivated, the drive transmission between the shaft 6 and the members 3 causes those members to rotate in the directions that are indicated by the small arrows in FIG. 1 of the drawings which directions are such, it will be remembered, that each member 3 revolves oppositely to its immediate neighbour or to both of its immediate neighbours. The pins or tines 19 on the rotating roller 16 that is located behind the soil working members 3 with respect to the direction A tend to produce an intensive further crumbling of the soil that has already been worked by the members 3. The scraping elements that are arranged between the successive circular rows or crowns of pins or tines 19 positively prevent the external surface of the roller body or sheath 18 from becoming coated with a more or less continuous layer of adhering mud or other sticky soil which otherwise frequently tends to occur, particularly when working with wet and/or heavy soil. In the embodiment of FIGS. 1 to 5 of the drawings, the elements or teeth 26 and 27 are all resiliently urged into engagement with the roller body or sheath 18 by the adjustable tension springs 32 and the four groups of those elements or teeth 26 and 27 that correspond to the four plates 25 are individually adjustable, and yieldable during operation, by way of the coiled springs 29 and co-operating recessed elements 30 (FIGS. 4 and 5). The elements 26 and 27 can thus be maintained effectively and reliably in contact with the roller 16 and any required adjustment can quickly and easily be made.

Reference to FIGS. 3 and 6 of the drawings will show that a plane which is tangential to the external curved surface of the roller body or sheath 18 along the line of engagement with the lower leading edges of the elements 26/27 or 36 is, of course, perpendicular to the plane a but is also inclined at an angle β, having a magnitude of not less than substantially 8°, to the general plane of the plate 25 or individual elements 36, said general plane excluding the forwardly and upwardly bent-over leading lower edge regions of the elements 26/27 or 36. This inclination of the plates 25 or elements 36 to said tangential plane ensures that, even on wet and heavy soil, adhering soil will reliably and continuously be scraped from the external surface of the roller body or sheath 18 and will be well crumbled. When the rotary harrow is used on lighter and/or drier soils, the initial degree of tension of the springs 32 or 39 may advantageously be relaxed by appropriate adjustments of the wing nuts 34A or 42. This reduces the pressure by which the elements 26/27 or 36 bear against the body or sheath 18 of the roller 16, it being noted that there is no point in maintaining a pressure beyond that which is required to effect continuous cleaning of the roller 16. The slight inclination of the lower edge regions of the elements 26/27 and 36 to the remainders of the corresponding plates 25 and elements 36 facilites shedding from those elements of the soil that has been detached from the roller 16. The axis that is defined by the shaft 22 or by the pivot pins 37 is located to the rear of the elements 26/27, or to the rear of the effective portions of the elements 36, with respect to the direction A and is located at a horizontal level which is little above that of the horizontal plane b which contains the axis of rotation (longitudinal axis) of the roller 16. Since the elements 26/27 and 36 make line engagement with the external surface of the roller body or sheath 18 at locations which are spaced by at least 10°, and preferably by substantially 40°, around the axis of rotation (longitudinal axis) of the roller 16 from the plane b in a direction opposite to the intended direction of operative rotation of the roller 16, any soil adhering to the roller is scraped off almost immediately after leaving the ground surface with the result that such soil is shed in quite small particles so that it is unusual for a large lump of detached soil to be left lying upon the surface of a seed bed or the like which the rotary harrow is preparing. Such lumps of soil that are sometimes left upon the surface of seed beds and the like by known rotary harrows and other soil cultivating implements tend to inhibit the germination and emergence of seedling plants.

When the scraping elements 42 of FIGS. 8 and 9 of the drawings are employed, their tips or points 44 act throughout a progressively widening surface upon soil adhering to the surface of the roller body or sheath 18 and this effect can be advantageous when dealing with heavy soils. The extremities of the tips or points 44 of the elements 43 are located even closer to the ground surface in the embodiment of FIGS. 8 and 9 of the drawings so that any adhering soil can be scraped off even more quickly after leaving that surface than in the case of the other embodiments. If desired, the carrier beam 35 of FIGS. 8 and 9 of the drawings may be mounted so as to be pivotable about substantially its own longitudinal axis, against adjustable resilient opposition, in the manner that has been described with reference to FIGS. 6 and 7. In the embodiment of FIGS. 10 and 11 of the drawings, each group of four scraping elements or teeth 48 can pivot about the axis of the corresponding shaft 50, against the action of the respective spring 52, independently of the other groups. Moreover, the resilient loading of the four groups of elements 48 can be independently adjusted by increasing or decreasing the degree of tension of the corresponding four springs 52.

Although certain features of the rotary harrow embodiments that have been described and/or that are illustrated in the accompanying drawings will be set forth in the following claims as inventive features, it is emphasised that the invention is not necessarily limited to those features and that it includes within its scope each of the parts of each rotary harrow embodiment that has been described, and/or that is illustrated in the accompanying drawings, both individually and in various combinations.

What we claim is:

1. A soil cultivating implement comprising a frame and soil working means rotatably mounted on said frame, said soil working means comprising a plurality of rotatable soil working members and driving means connected to rotate said members, said soil working means further including an elongated supporting roller that is located to the rear of said soil working members, said roller being pivotably connected to said frame with arms and displaceable upwardly and downwardly about a pivotal axis in position relative to said frame, means retaining said arms in adjusted angular settings about the pivotal axis relative to said soil working members, said arms extending to the rear of said roller and scraping elements supported on common carrier means that is connected to said arms rearwardly of said roller, said scraping elements comprising parts that extend downwardly from the carrier to engage the outer surface of the roller at a point below the latter's axis of rotation, and immediately above the ground surface, the position of each element being defined by a first plane passing through said point and the axis of rotation of said roller, said first plane being inclined to the horizontal by an angle of at least 10°, a further plane tangential to said point being inclined to at least a major portion of said element whereby soil is shed substantially immediately as said outer surface leaves the ground.

2. An implement as claimed in claim 1, wherein said elements are mounted in groups and each of said groups comprises automatic individual adjustment means that pivots that group and modifies its position relative to the roller independently of the other groups.

3. An implement as claimed in claim 2, wherein each group is individually pivotable about an axis that extends substantially parallel to the axis of rotation of said roller.

4. An implement as claimed in claim 3, wherein each scraping element group resiliently engages said surface of the roller and adjustable pressure means regulates the amount of pressure of resilient engagement for each group.

5. An implement as claimed in claim 3, wherein neighboring groups of scraping elements are interconnected by a spring.

6. An implement as claimed in claim 5, wherein each spring connection between neighboring groups includes a spring coiled around a shaft that defines the axis of pivotable adjustability of said groups.

7. An implement as claimed in claim 3, wherein said groups are connected to a single common shaft about which they are pivotable against spring opposition, in at least one direction.

8. An implement as claimed in claim 3, wherein each group of scraping elements comprises a single sheet and slot-shaped gaps, said sheets are located between the elements, said roller having projecting pins that move through said gaps during operation.

9. An implement as claimed in claim 8, wherein said sheets are positioned in successive close neighboring relationship to one another.

10. An implement as claimed in claim 3, wherein said parallel axis is located to the rear of the major portion of the scraping elements, with respect to the normal direction of implement travel and said parallel axis is located at a horizontal above the axis of rotation of said roller.

11. An implement as claimed in claim 1, wherein said carrier means is elongated and opposite ends thereof are pivotally interconnected to said arms, at least one spring interconnecting said arms with said carrier means to urge said elements into contact with said roller.

12. An implement as claimed in claim 11, wherein said elements are mounted along the length of a bar member that is pivoted to a carrier beam, said spring means interconnecting further arms on said bar member to the arms of said roller.

13. A soil cultivating implement comprising a frame and soil working means rotatably mounted on said frame, said soil working means comprising a transverse row of soil working members that are rotatable about respective upwardly extending axes and driving means connected to rotate said members about said axes, said soil working means further including an elongated supporting roller that is located to the rear of said soil working members, said roller being pivotably connected to said frame with arms and displaceable upwardly and downwardly about a pivotal axis in position relative to said frame, means retaining said arms in adjusted angular settings about the pivotal axis relative to said soil working members, said arms extending to the rear of said roller and scraping elements supported on common carrier means that is connected to said arms rearwardly of said roller, said scraping elements comprising parts that extend downwardly from the carrier to engage the outer surface of the roller below the latter's axis of rotation, the position of at least one of said elements being defined by a first plane passing through the axis rotation of said roller and the approximate point of engagement of the element with said roller, said first plane being inclined to the horizontal by an angle of about 40°, a further plane tangential to said engagement point being inclined to at least a major portion of said element.

14. An implement as claimed in claim 13, wherein each of said elements terminates in a symmetrically formed tip part.

15. An implement as claimed in claim 14, wherein said tip part is stiffened along its symmetrically opposed edges and is curved to match the curvature of the surface of said roller.

* * * * *